March 17, 1964     R. WALKER     3,124,970
PEDAL MECHANISM

Filed Nov. 18, 1960     4 Sheets-Sheet 1

INVENTOR.
Raymond Walker
BY
HIS ATTORNEY

INVENTOR.
Raymond Walker
BY
HIS ATTORNEY

INVENTOR.
Raymond Walker
BY
HIS ATTORNEY

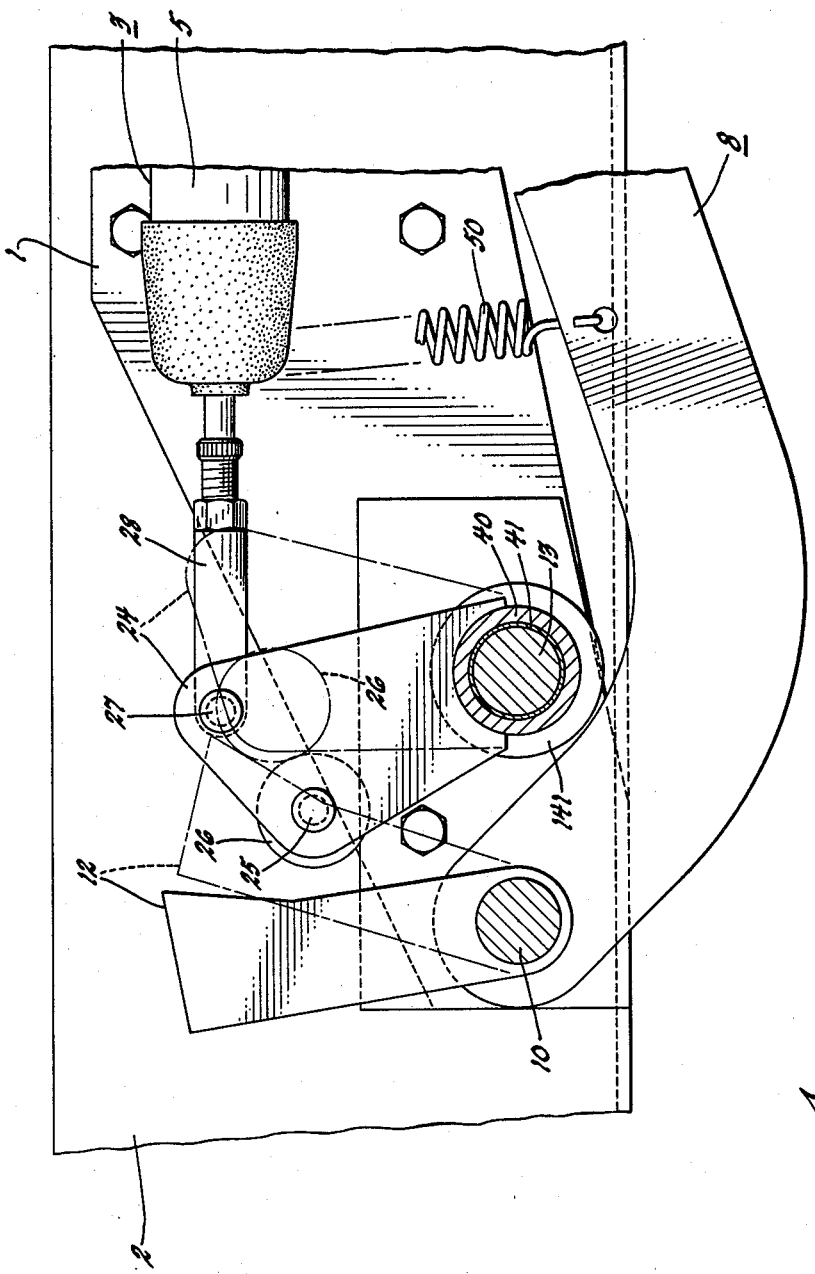

United States Patent Office 3,124,970
Patented Mar. 17, 1964

3,124,970
PEDAL MECHANISM
Raymond Walker, Birmingham, Mich., assignor to General Motors Corporation, Detroit, Mich., a corporation of Delaware
Filed Nov. 18, 1960, Ser. No. 70,174
5 Claims. (Cl. 74—478)

This invention relates to a vehicle clutch and brake and more particularly to a pedal mechanism for operating a vehicle clutch and brake.

In the conventional delivery truck which is used to deliver merchandise in residential areas, it is often customary to stand when driving the vehicle. The driver may also have the convenience of sitting as well as standing in operating of the motor vehicle. During the time, however, that the operator is standing it is necessary that he be able to operate the vehicle clutch and brake. If separate clutch and brake pedals are employed to operate the vehicle clutch and brake individually, it is inconvenient to operate in this manner when the operator is in the standing position. Accordingly, this invention is intended to provide a means for operating the vehicle clutch and a vehicle brake by a single pedal means.

It is an object of this invention to provide a single pedal mechanism for operating the vehicle clutch and vehicle brake in a motor vehicle.

It is another object of this invention to provide a single pedal for operating a cam means about a first axis which in turn controls the operation of the vehicle clutch and the vehicle brake.

It is a further object of this invention to provide a pedal means rotating about a first axis which also pivotally supports a cam mechanism. The cam mechanism operates an idler means which rotates about a second axis and operates the vehicle clutch and the vehicle brake in response to the single pedal operation of the cam means.

The objects of this invention are accomplished by means of a shaft which is pivotally supported on a stationary member and pivotally supports a single pedal. The shaft also carries a dual cam arrangement for operating the vehicle clutch and the vehicle brake. An idler shaft is supported on the stationary member pivotally carrying a roller mechanism which engages the clutch cam and the brake cam to operate a clutch and brake operating mechanism in response to actuation of said cam means. In this manner, the vehicle clutch is initially disengaged and subsequently the vehicle brakes are operated.

Further objects and advantages of the present invention will be apparent from the following description, reference being had to the accompanying drawings wherein preferred embodiments of the present invention are clearly shown.

In the drawings:

FIGURE 4 is a cross-section view taken on line 4—4 of FIGURE 2.

Figure 1:
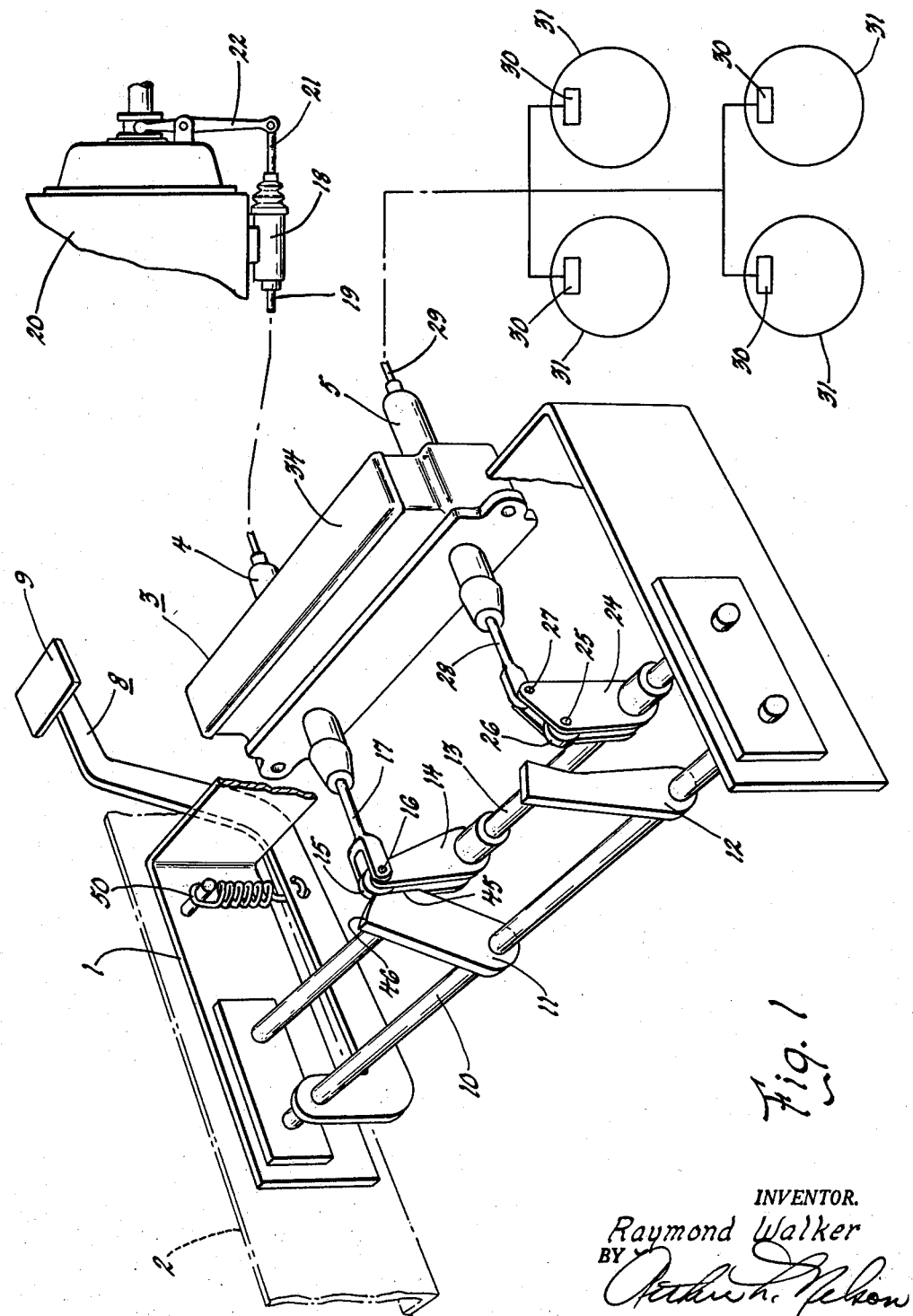
FIGURE 1 is a three-dimensional view illustrating the single pedal operating the cam means which in turn operate the vehicle clutch and brake.

Referring to FIGURE 1, the bracket 1 is mounted on the chassis 2. The bracket 1 forms a supporting means for the casting 3 which is cast integral to form the clutch operating master cylinder 4 and the brake operating master cylinder 5. The casting 3 is fastened to the bracket 1 by means of a plurality of bolts 6 and nuts 7.

The pedal 8 is provided with a toe-piece 9. The pedal 8 is connected to the pedal shaft 10. The shaft is pivotally supported for rotational movement in the bracket 1.

The intermediate portion of the pedal shaft 10 is connected to the clutch cam 11 and a brake cam 12. The cams 11 and 12 rotate as a unit with the brake pedal 8 as the shaft rotates on its axis.

The idler shaft 13 is also pivotally supported on the bracket 1. The idler shaft 13 pivotally carries the clutch arm 14 which rotates with respect to the idler shaft 13. The clutch arm supports the roller 15. The roller is pivotally connected to the arm 14 by the pin 16 which also fastens the push rod 17. The push rod 17 extends into the clutch master cylinder 4 and engages a clutch master piston (not shown). The movement of the push rod into the master cylinder 4 pressurizes fluid by moving the master piston in the master cylinder 4 which in turn pressurizes fluid within the slave cylinder 18.

The slave cylinder 18 is connected to the master cylinder by the conduit means 19. The slave cylinder 18 is mounted on the transmission housing 20. The housing encloses a clutch mechanism which is operated by the push rod 21 as it pivots the fork lever 22 which engages the clutch operating mechanism.

The idler shaft 13 also pivotally carries the brake arm 24. The brake arm 24 includes a two-piece arm fastened to the idler shaft 13. The pin 25 pivotally supports the roller 26. The pin 27 pivotally connects the push rod 28 which operates within the brake master cylinder 5. As the push rod 28 moves axially into the brake master cylinder 5, fluid is pressurized within the brake master cylinder 5 and the conduit means 29 which is in communication with the plurality of wheel cylinders 30. The pressurization of fluid in the master cylinder 5 actuates the plurality of vehicle brakes 31.

Figure 2:
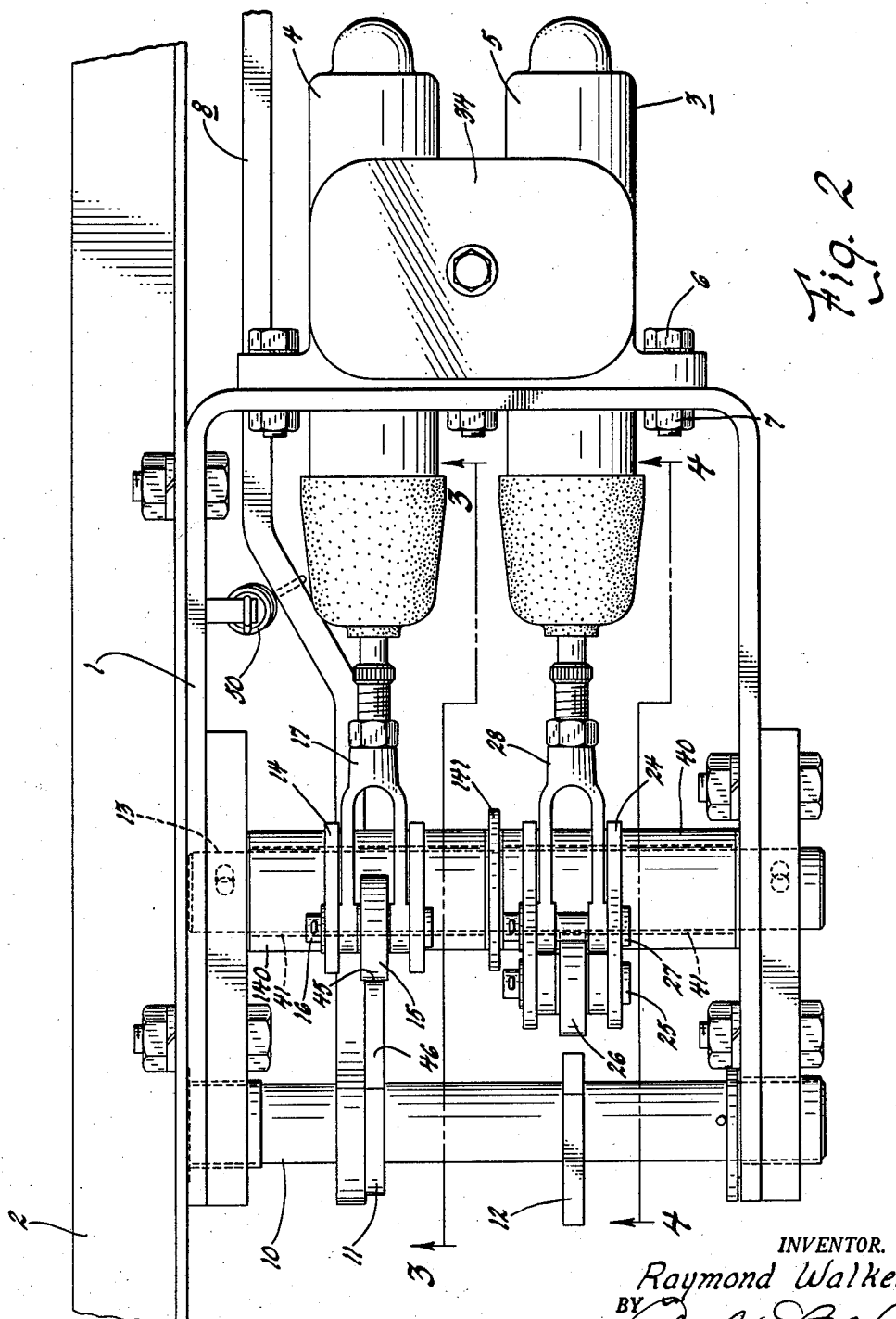
FIGURE 2 is a plan view of the mechanism for operating the vehicle clutch and brake.

Referring to FIGURE 2, the chassis 2 provides a supporting means for the bracket 1. The casting 3 is shown supported by the bracket 1 and fastened by means of the plurality of bolts 6 and 7. A common reservoir 34 encloses a fluid supply for the clutch master cylinder 4 and the brake master cylinder 5.

The pedal 8 is fastened to the pedal shaft 10 which supports the clutch cam 11 and brake cam 12. The device as shown in FIGURE 2 is in the retracted position whereby the clutch cam 11 is contacting the roller 15 but not disengaging the clutch mechanism. The brake cam 12 is in spaced relation to the roller 26 which in turn is connected to the brake operating mechanism.

FIGURE 2 more clearly shows the connecting means for the push rod 17 and the roller 15 which are pivotally connected to the pin 16. The pin 16 is supported on the arm 14. It is noted that the arm 14 comprises two pieces which are welded to the spacer 140 and mounted on the idler shaft 13. The idler shaft 13 is mounted on the bracket 1 and spacers 40 and 140 receive the shaft 13 to maintain alignment of the arm 14 and the arm 24 relative to the cam means 11 and 12. The section views 3 and 4 are taken as indicated on FIGURE 2.

FIGURE 2 illustrates a shaft 13 which provides a rotational support for the spacers 40 and 140. The spacers 40 and 140 rotate on the shaft 13 and carry the arms 24 and 14 which are welded to their respective spacers. The spacers maintain their axial position through the engagement of their ends with the bracket 1 and washer 141. This in turn aligns the arms, the rollers, and the brake and clutch actuating means with their respective cams. It is necessary that the corresponding cam for the brake and clutch engage the corresponding roller to actuate the vehicle clutch and brake.

Figure 3:
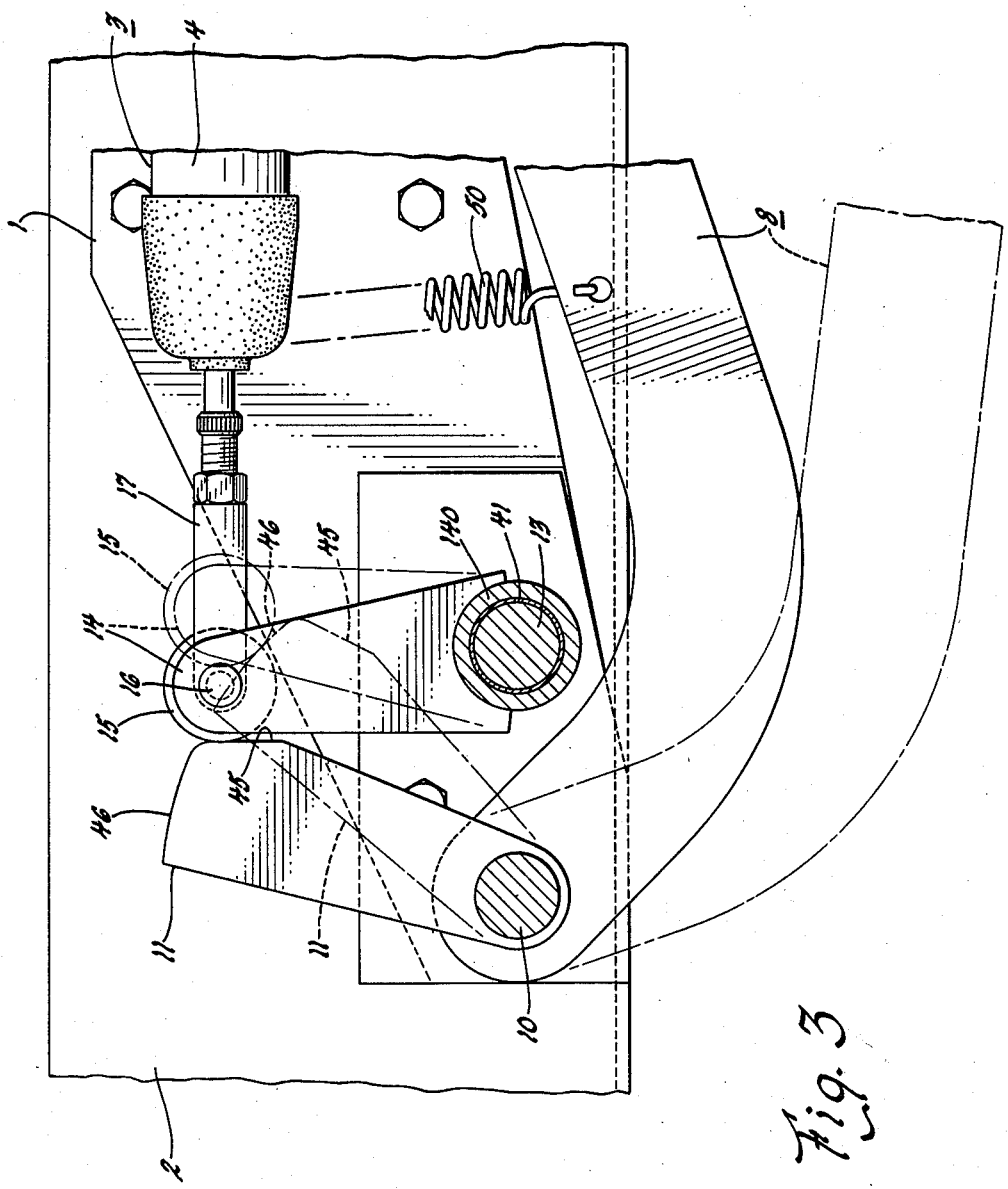
FIGURE 3 is a cross-section view taken on line 3—3 of FIGURE 2.

Referring to FIGURE 3, the clutch operating mechanism is illustrated. The clutch master cylinder 4 is operated by the push rod 17. The push rod 17 is connected to the roller 15 by the pin 16 which are in turn pivotally supported on the arm 14. It is noted that the arm 14 is welded to the spacer 140 which is supported on a bushing 41 which receives the supporting shaft 13.

The pedal 8 is fastened to the shaft 10 and is shown in the two positions which are the retracted and the actuated positions, the actuated position being shown in the phantom view. The pedal 8 is connected to the same shaft as the cam 11. The cam 11 rotates as the pedal 8 rotates thereby actuating the roller 15 on the clutch operating mechanism.

Referring to FIGURE 4, the view is taken from FIGURE 2 as indicated by the arrows 4—4. The pedal 8 is fastened to the shaft 10 which pivotally rotates in the bracket 1. The bracket 1 is fastened to the chassis 2. As the pedal 8 is depressed, the brake cam 12 which is also fastened to the shaft 10 rotates about the axis of the shaft 10. The cam 12 is shown in the retracted position and also is indicated in the actuated position by the phantom line. The spacer 40 pivotally rotates on the bushing 41 which is received about the outer periphery of the shaft 13. The arm 24 supports the roller 26 by means of the pin 25. The roller 24 engages the brake cam 12 as the pedal 8 is depressed. The pivoting movement of the pedal 8 causes the cam 12 to move the roller in an arcuate manner pivoting about the center of the shaft 13. The arm 24 being pivotally connected by the pin 27 to the push rod moves the push rod 28 into the brake master cylinder 5 to actuate the vehicle brakes.

The operation of the pedal mechanism will be described in the following paragraphs.

It is pointed out that the device as illustrated is intended to provide a means for actuating the clutch and the brake by a single pedal. A parallel system may be installed within the vehicle whereby the brakes alone may be operated by a separate lever and the clutch may also be operated by a separate lever. This invention, however, relates only to the means whereby the vehicle clutch and the vehicle brake are operated by a single pedal. As the brake pedal 8 is depressed, the pedal rotates the pedal shaft 10. The pedal shaft 10, being connected to the pedal 8 and the clutch cam 11 and the brake cam 12, rotates the cams simultaneously. The clutch cam 11 engages the roller 15 biasing the arm 14 through a rotating movement moving the push rod 17 axially into the clutch master cylinder 4. As the clutch arm 14 rotates, the roller 15 moves upward on the engaging surface 45 of arm 14. Continued rotation of the pedal shaft by the pedal 8 pivots the clutch arm 14 about the axis of the shaft 13 until the arcuate portion 46 on the cam 11 engages the roller 15. Continued rotation of the shaft 10 causes the cam 11 to pivot under the roller 15 on the arm 14. The arcuate surface 46 maintains the push rod in a fixed relation to the master cylinder 4. At this point, however, fluid has been pressurized within the clutch master cylinder 4 and the slave cylinder 18. The pressurization of fluid in the master cylinder and a displacement of fluid from the master cylinder to the slave cylinder 18 causes movement of the push rod 21 and the fork lever 22. The pivotal movement of a clutch engaging fork lever 22 causes disengagement of the vehicle clutch. The vehicle clutch is disengaged prior to the engagement of the arcuate surface 46 on the cam 11 in disengagement of the mechanism. The clutch remains disengaged although the cam 11 continues to rotate under the roller 15.

With the continued rotation of the pedal shaft due to continued movement of the pedal 8, the brake cam 12 engages the roller 26. With the engagement of the brake cam 12 and the roller 26, the push rod moves axially within the brake master cylinder 5. The rotational movement of the arm 24 causes pressurization in the brake master cylinder 5 and fluid displacement to the wheel cylinders 30 in the plurality of the vehicle brakes 31. This in turn causes an actuation of the brakes in response to the degree of pressurization in the master cylinder 5.

It can be seen that the vehicle clutch is disengaged prior to the actuation of the vehicle brake. The vehicle brake may be actuated to any degree desired as the clutch remains disengaged and in the same position regardless of the continued movement of the single pedal 8 in actuation of the vehicle brakes.

As the vehicle brakes are released, the pedal pressure on the pedal 8 is released. The brake pedal 8 is retracted by means of the spring 50 which is connected to the bracket and the pedal 8. The return rotation of the pedal 8 disengages the brake cam 12 from the roller 26 permitting the braking means to return to its normal position. The clutch mechanism is biased to a return position initially through the spring 50 operating on the pedal 8 and when the roller 15 engages the surface 45, the clutch cam 11 is biased through a return rotation due to the spring means within the clutch master cylinder and the clutch engaging springs.

While the embodiments of the present invention as herein disclosed constitute preferred form, it is to be understood that other forms might be adopted.

What is claimed is as follows:

1. In a clutch and brake control system having a first operable member for operating a clutch and a second operable member for operating a brake, a frame mounting said members, first and second cam follower means pivotally mounted on said frame and operatively connected to respectively operate said first and second operable members, first and second cam means pivotally mounted on said frame and operatively and respectively engageable with said first and second cam follower means in camming relation, and unitary pedal means operatively connected for simultaneously moving said first and second cam means, said first cam means being positioned relative to said second cam means to engage said first cam follower means and operate said first operable member to a predetermined position of operation thereof upon movement of said first and second cam means by said unitary means before said second cam means engages said second cam follower means, said first cam means being so formed that, upon further movement of said first and second cam means to operate said second operable member by said second cam means engaging and acting on said second cam follower means, said first cam means holds said first operable member in said predetermined position of operation.

2. In a clutch and brake control system having a clutch operating member and a brake operating member, support means for said members, first cam follower means movably supported on said support means and operatively connected to operate said clutch operable member and second cam follower means movably supported on said support means and operatively connected to operate said brake operable member, first and second cam means operatively and respectively engageable with said first and second cam follower means movably supported on said support means and in camming relation, and a unitary clutch and brake control pedal movably supported on said support means and operatively connected to said first and second cam means for simultaneously movement thereof, said first cam means being positioned in relation to said second cam means to engage said first cam follower means and operate said clutch operable member to a clutch disengageable position of operation thereof upon movement of said first and second cam means by said unitary pedal before said second cam means engages said second cam follower means in operating relation, said first cam means being so formed that, upon further movement of said first and second cam means to operate said brake operable member by said second cam means engaging and acting on said second cam follower means, said first cam means holds said clutch operable member in the clutch disengageable position of operation.

3. In the control system of claim 2, said unitary pedal being operatively connected to move said first and second cam means with said second cam means acting on said second cam follower means to permit return of said brake operable member to a brake release position while said first cam means continues to hold said clutch operable member in the clutch disengageable position of operation, said unitary pedal then being further operable to move said first and second cam means to cause said first cam means to act through said first cam follower means and operate said clutch operable member to a clutch engageable position of operation.

4. In the control system of claim 2, a first rotatable shaft rotatably mounted on said support means and having said unitary pedal secured thereto for rotation by movement of said pedal and said first and second cam means secured thereto for rotatable camming action thereof with said first cam means being positioned angularly ahead of said second cam means.

5. In the control system of claim 4, a second shaft mounted on said support means and having said first and second cam follower means independently rotatably mounted thereon.

References Cited in the file of this patent

UNITED STATES PATENTS

| 1,499,427 | Tullar | July 1, 1924 |
| 2,534,435 | Ghurye | Dec. 19, 1950 |

FOREIGN PATENTS

| 875,768 | Germany | Sept. 6, 1954 |